United States Patent [19]

Breitschwerdt

[11] 4,042,276
[45] Aug. 16, 1977

[54] SEAT, ESPECIALLY CO-DRIVER SEAT IN A MOTOR VEHICLE
[75] Inventor: Werner Breitschwerdt, Stuttgart, Germany
[73] Assignee: Daimler-Benz Aktiengesellschaft, Germany
[21] Appl. No.: 281,281
[22] Filed: Aug. 17, 1972
[30] Foreign Application Priority Data
Aug. 17, 1971 Germany ............................. 2141147
[51] Int. Cl.² ........................................... B60R 21/10
[52] U.S. Cl. .................................. 297/216; 297/385; 297/388
[58] Field of Search ............... 297/216; 248/429, 499, 248/386, 388; 188/1 C
[56] References Cited
U.S. PATENT DOCUMENTS
2,277,947  3/1942  Bailey ................................. 248/429
2,990,009  6/1961  Moeller ............................... 297/385
3,059,966  10/1962 Spielman
3,100,669  8/1963  Monroe ............................... 297/388
3,186,760  6/1965  Lohr et al. .......................... 297/216
3,288,422  11/1966 Krause ................................ 248/429
3,479,099  11/1969 Krause ............................ 248/429 X
3,661,352  5/1972  McFarlane .......................... 248/429

Primary Examiner—Paul R. Gilliam
Assistant Examiner—Victor N. Sakran
Attorney, Agent, or Firm—Craig & Antonelli

[57] ABSTRACT

A seat, particularly a co-driver seat in a motor vehicle with a seat-adjusting mechanism effective in the vehicle longitudinal direction in which the seat-adjusting mechanism, when exceeding a predetermined load which is effective forwardly in the displacement direction, automatically initiates an adjusting movement of the seat in the same direction by a predetermined amount if the seat is occupied by a person whose safety belt is not fastened.

17 Claims, 2 Drawing Figures

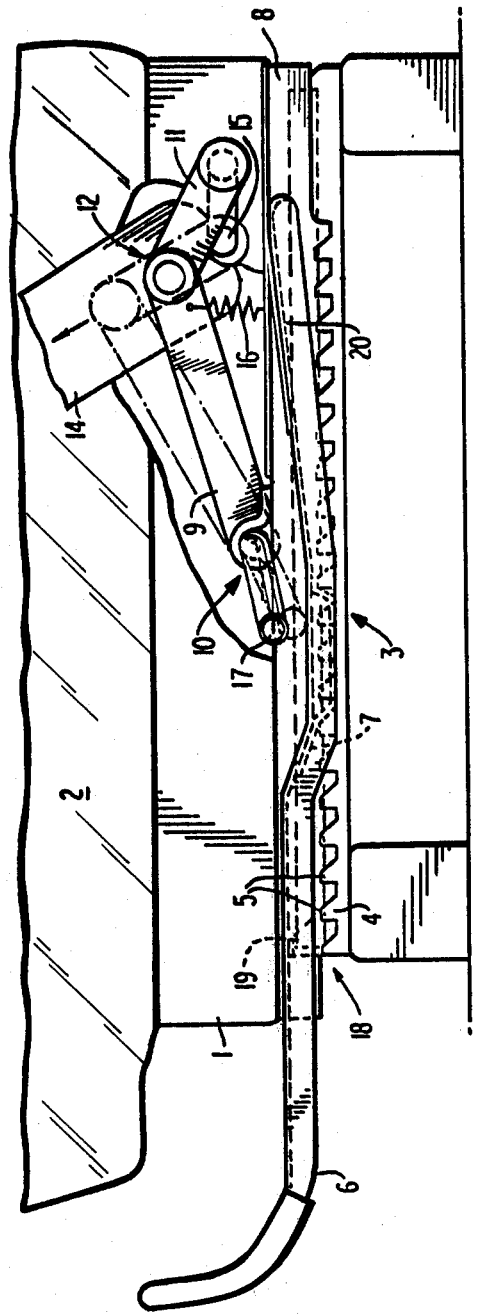
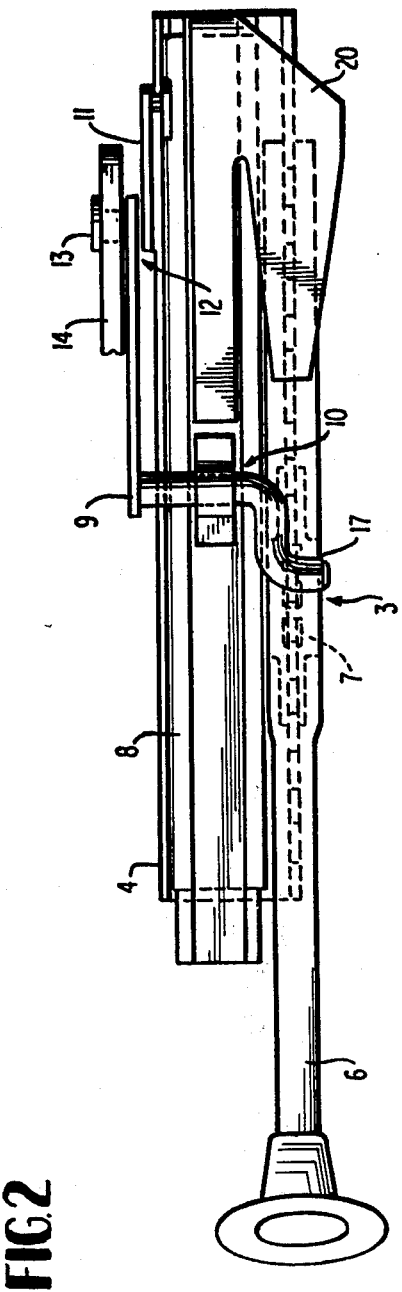

SEAT, ESPECIALLY CO-DRIVER SEAT IN A MOTOR VEHICLE

The present invention relates to a seat, especially to a co-driver or passenger seat in a motor vehicle with a seat-adjusting mechanism effective in the vehicle longitudinal direction.

Even though one obtains a particularly easy accessibility of the front seats by a displacement of the seat in the rearward direction, one increases at the same time, however, the distance between the passengers and the instrument panel.

Tests, especially in connection with test dummies whose safety belts were not fastened or buckled have indicated that in case of a vehicle front end impact or collision at first a displacement of the passenger takes place up to the impingement of the knees and chest thereof at the instrument panel. In the further course of movement, a downward lever movement of the pelvis takes place by the upper thighs engaging the instrument panel from below. By reason of the large load on the relatively soft front portion of the seat, a sliding off of the passengers into the leg space is made possible. For the most part, serious fracture- and flexion-appearances occur thereby at the cervical vertebrae and skull base with serious injuries in part.

It is the aim of the present invention to create a possibility while maintaining as much as possible the customary seat-adjusting mechanisms, to reduce with non-buckled passengers, i.e., whose seat belts are not fastened, in case of danger the distance thereof relative to the instrument panel and to the steering wheel to such an extent that the injury danger is considerably reduced.

Accordingly, a seat, especially a co-driver seat in a motor vehicle with a seat-adjusting mechanism effective in the vehicle longitudinal direction, is proposed in which according to the present invention the seat-adjusting mechanism, when exceeding a predetermined load effective forwardly in the displacing direction, initiates automatically an adjusting movement of the seat in the same direction by a predetermined amount if the seat is occupied by a non-buckled person, i.e., a person whose seat belt is not fastened.

According to a preferred embodiment of the present invention, a toothed rail or rack fixed at the vehicle and provided with teeth extending obliquely in the driving direction is provided as seat-adjusting mechanism, into which engages elastically or springily a tooth-locking means projecting from an actuating lever connected to the seat lower portion.

According to a further feature of the inventive subject matter, a pivotally supported lever cranked several times is pivotally connected with a guide lever means guided in the seat lower part with a bolt provided at the pivotal connection for receiving and mounting a free safety belt end.

Distracting and annoying noises are avoided and a safe adjusting function is achieved if the lever in its rest position is supported at the guide lever means by the force of a spring and if its end coordinated to the actuating lever within the area of the tooth-locking means limits the upward movement of the actuating lever during the adjusting operation.

A predetermined distance between seat and instrument panel or seat and steering wheel is maintained if the toothed rail is provided at its forward end with an abutment, against which comes into abutment the tooth-locking means upon reaching a predetermined position of the seat.

A seat displacement is prevented if with a tensional load effective at the free belt end and exceeding the tensional force of the spring the toothlocking means effects a locking action with the toothed rail by the end of the multi-cranked lever acting on the actuating lever.

Accordingly, it is an object of the present invention to provide a seat, especially a co-driver seat in a motor vehicle which avoids by simple means the aforementioned shortcomings and drawbacks encountered in the prior art.

Another object of the present invention resides in a seat for motor vehicles which considerably reduces the injury danger by automatically reducing the distance of the passengers to the instrument panel or steering wheel in case of an accident, particularly when the safety belts are not fastened.

A further object of the present invention resides in a seat, particularly in a co-driver seat for a motor vehicle, which is not only simple in construction and reliable in operation but avoids disturbing noises during normal operation and utilizes relatively few simple parts.

These and other objects, features, and advantages of the present invention will become more apparent from the following description when taken in connection with the accompanying drawing which shows, for purposes of illustration only, one embodiment in accordance with the present invention, and wherein:

FIG. 1 is a side view of an adjusting mechanism in accordance with the present invention arranged at a seat bottom part of a motor vehicle; and FIG. 2 is a plan view of the adjusting mechanism of FIG. 1.

Referring now to the drawing wherein like reference numerals are used throughout the two views to designate like parts, a seat bottom part 1 (FIG. 1) of a seat 2, not illustrated in detail, includes a seat-adjusting mechanism generally designated by reference numeral 3 which essentially consists of a toothed rail or rack 4 fixed at the vehicle and having teeth 5 extending obliquely in the driving direction, and of an actuating lever 6 operatively connected with the seat lower part 1, from which projects a tooth-locking device 7 and engages elastically in the toothed rail 4. The toothed rail 4 is connected in a manner not illustrated by held roller bodies with a seat guide rail 8 projecting from the seat lower part 1.

A lever 9 which is cranked several times is pivotally supported in the area generally designated by reference numeral 10 at the seat guide rail 8 and is pivotally connected with a guide lever means 11. The pivot place 12 between the lever 9 and the guide lever means 11 is provided with a bolt 13 that receives a free end 14 of a safety belt. The end of the guide lever means 11 opposite the pivot place 12 is guided in an elongated aperture 15 within the lower seat portion 1 and is supported in the rest position by the force of a spring 16 against the lever 9 so that the end 17 thereof disposed within the area of the tooth-locking means 7 is lifted off and limits any possible upward movement of the actuating lever 6 for the purpose of the adjustment of the seat 2. The toothed rail 4 is provided at its forward end 18 with an abutment 19, at which abuts the tooth-locking device 7 when reaching a predetermined seat position.

If a person without a fastened seatbelt occupies the seat 2 and if a predetermined load acting in the vehicle longitudinal direction is exceeded at the seat-adjusting mechanism, then the tooth-locking means 7 slides upwardly along the inclined teeth 5 facing the same and becomes disengaged whereby an automatic displacement of the seat 2 in the direction of the instrument panel (not shown) or steering wheel (not shown) takes place. When the movement is limited by the abutment 19, a position of the seat 2 is reached which no longer permits a sliding off of the passenger. The magnitude of the disengaging force and of the disengaging delay can be changed within wide limits by the selection of the inclination of the teeth 5.

If a person with fastened seat belt occupies the front seat 2, then upon the occurrence of a tensional load at the free end 14 of the safety belt in the indicated arrow direction, which exceeds the tensional force of the spring 16, the lever 9 is displaced into the position indicated in dash and dot lines. The shackle 11 is thereby supported at the forward, rounded-off portion of the elongated aperture 15 and the end 17 of the lever 9 presses the actuating lever 6 operatively connected with the seat guide rail 8 by way of a spring plate 20 in the direction of the toothed rail 4 so that the tooth-locking device 7 is prevented from its disengagement.

While I have shown and described only one embodiment in accordance with the present invention, it is understood that the same is not limited thereto but is susceptible of numerous changes and modifications as known to those skilled in the art, and I therefore do not wish to be limited to the details shown and described herein but intend to cover all such changes and modifications as are encompassed by the scope of the appended claims.

What I claim is:

1. A seat for a vehicle equipped with safety belts operatively associated with the seat, characterized in that adjusting means are provided for permitting selective adjustment of the seat in the vehicle, means are connected to the seat-adjusting means and at least one of the safety belts for automatically initiating a predetermined displacement movement of the seat by a predetermined amount upon exceeding a predetermined load effective on the seat in the displacement direction if the seat is occupied by a person whose safety belt is not fastened.

2. A seat according to claim 1, characterized in that the seat is a seat in a motor vehicle with a seat-adjusting means effective in the vehicle longitudinal direction.

3. A seat according to claim 2, characterized in that the seat is a passenger seat alongside the driver seat of the vehicle.

4. A seat with a seat-adjusting means to enable adjustment of the seat of a vehicle, characterized in that the seat-adjusting means includes means for automatically initiating, upon exceeding a predetermined load effective forwardly in the displacement direction, a displacement movement of the seat in the same direction by a predetermined amount if the seat is occupied by a person whose safety belt is not fastened, said seat-adjusting means includes a fixed toothed rail means having teeth extending obliquely in the forward vehicle direction, and wherein said seat includes a seat bottom portion, said seat-adjusting means further including an actuating lever having a spring biased tooth-locking means projecting therefrom, said actuating lever being operatively connected with said seat bottom portion.

5. A seat according to claim 4, wherein said toothed rail means is provided at its forward end with an abutment means for abutting said tooth-locking means when reaching a predetermined position of the seat.

6. A seat according to claim 4, wherein said means for automatically initiating the displacement of said seat includes a pivotally mounted multi-cranked lever means pivotally connected with a guide lever means guided in the seat bottom portion, and wherein a bolt is provided at said pivotal connection of said guide lever means and said multi-cranked lever means for operatively connecting a free safety belt end with said multi-cranked lever means and said guide lever means.

7. A seat according to claim 1, wherein said means for automatically initiating the displacement of said seat includes a pivotally mounted multi-cranked lever means pivotally connected with a guide lever means guided in a seat bottom portion, and wherein a bolt is provided at the pivotal connection of said cranked lever means and said guide lever means for mounting thereon a free safety belt end.

8. A seat according to claim 7, wherein an elongated slot is provided in the seat bottom portion, and wherein an end of said guide lever means opposite the pivotal connection with said multi-cranked lever means is selectively displaceable in said elongated slot to permit a displacement of the multi-cranked lever means from a normal rest position to a second position upon application of a predetermined tensional load effective at the free safety belt end whereby said multi-cranked lever means prevents a displacement movement of the seat.

9. A seat according to claim 7, wherein said multi-cranked lever means is displaceable from a normal rest position at said guide lever means to a second position, said seat-adjusting means includes an actuating lever having a spring biased tooth-locking means projecting therefrom, a spring means is provided for supporting said multi-cranked lever means in said normal rest position, and wherein one end of said multi-cranked lever means is coordinated to said actuating lever within the area of said tooth-locking means for limiting the upward movement of said actuating lever during a seat-adjusting operation.

10. A seat according to claim 6, wherein said multi-cranked lever means is displaceable from a rest position to a second position upon the application of a tensional load effective at the free safety belt end exceeding a predetermined tensional force, said multi-cranked lever means in said second position acting on the actuating lever to displace the tooth-locking means to effect a locking with the toothed rail means.

11. A safety seat arrangement for a vehicle having safety belts, comprising: a seat, means for movably mounting said seat in the vehicle, seat adjusting means for selectively adjusting the position of said seat along said mounting means, means operatively connected with said seat adjusting means and the safety belt for automatically initiating a predetermined displacement of said seat in the forward vehicle direction upon exceeding a predetermined load effective forwardly in the displacement direction if the safety belt of the occupied seat is not fastened.

12. A seat according to claim 11, wherein said means for movably mounting said seat includes a fixed toothed rail means having teeth extending obliquely in the forward vehicle direction, and wherein said seat includes a seat bottom portion, said seat adjusting means including an actuating lever having a spring biased tooth-locking means projecting therefrom, said actuating lever being operatively connected with said seat bottom portion.

13. A seat according to claim 11, wherein said means for automatically initiating the displacement of said seat includes a pivotally mounted multi-cranked lever means, a guide lever means pivotally connected with said cranked lever means guided in said seat bottom portion, and wherein a bolt is provided at the pivotal connection of said guide lever means and said cranked lever means for operatively connecting a free safety belt end with said cranked lever means and said guide lever means.

14. A seat according to claim 13, wherein said cranked lever means is displaceable from a normal rest position at said guide lever means to a second position, and wherein a spring means is provided for supporting said cranked lever means in said normal rest position, and wherein one end of said cranked lever means is coordinated to said actuating lever within the area of said tooth-locking means for limiting the upward movement of said actuating lever during an adjusting operation of said seat.

15. A seat according to claim 14, wherein said toothed rail means is provided at its forward end with an abutment means for abutting said tooth-locking means when reaching said predetermined displacement of said seat.

16. A seat according to claim 15, wherein said cranked lever means is displaced to said second position upon application of a tensional load effective at the free safety belt end exceeding the tensional force of said spring means, said end of said cranked lever means coordinated to said actuating lever acting on said actuating lever to displace said tooth locking means to effect a locking with said tooth rail means.

17. A seat according to claim 16, wherein an elongated slot is provided in said seat bottom portion, and wherein the end of said guide lever means opposite the pivotal connection with said cranked lever means is movably guided in said elongated slot upon application and release of the tensional load effective at the free safety belt end whereby said cranked lever means is selectively displaceable to and from the normal rest position and the second position.

* * * * *